United States Patent [19]
Metzger, Jr. et al.

[11] Patent Number: 5,191,821
[45] Date of Patent: Mar. 9, 1993

[54] LEVER LOCK HOLD DOWN MECHANISM

[75] Inventors: James I. Metzger, Jr., Ballwin; Frank Tomiser, Jr., St. Louis, both of Mo.

[73] Assignee: Emerson Electric Co., St. Louis, Mo.

[21] Appl. No.: 800,212

[22] Filed: Nov. 29, 1991

Related U.S. Application Data

[63] Continuation-in-part of Ser. No. 507,459, Apr. 11, 1990, abandoned.

[51] Int. Cl.$^5$ .............................................. B27B 5/29
[52] U.S. Cl. ...................................... 83/425; 83/437; 83/581; 269/6
[58] Field of Search ................... 83/435.1, 437, 425, 83/477.2, 581; 269/6

[56] References Cited

U.S. PATENT DOCUMENTS

| | | | |
|---|---|---|---|
| 2,759,503 | 8/1956 | Goldschmidt | 143/51 |
| 4,658,686 | 4/1987 | Woods | 83/425 |
| 4,874,155 | 10/1989 | Goul | 269/6 |
| 4,893,801 | 1/1990 | Flinn | 269/6 |
| 4,926,722 | 5/1990 | Sorensen et al. | 81/487 |
| 4,932,638 | 6/1990 | Chen | 269/6 |

Primary Examiner—Frank T. Yost
Assistant Examiner—Scott A. Smith
Attorney, Agent, or Firm—Polster, Lieder, Woodruff & Lucchesi

[57] ABSTRACT

A lever lock hold down mechanism for clamping workpieces to a miter gauge is disclosed as including a workpiece supporting base or bar and a generally vertically directed workpiece supporting head extending upwardly from the base or bar. Extending further upwardly from the workpiece supporting head is a clamping frame having a vertically adjustable clamping rod slidably mounted to the frame and also having a clamping foot at its lower end. A spring biased apertured gripper plate is mounted over the rod in the vicinity of the clamping frame, and a lever lock is pivotally mounted to the clamping frame for engaging and disengaging the apertured gripper plate relative to the clamping rod. The lever lock and apertured gripper plate is configured, arranged and dimensioned so as to be moved out of engagement with the rod when the lever lock is moved upward to a released position, the lever lock also being capable of being pivotally moved into engagement with the apertured gripper plate so as to apply continuous gripping engagement to the clamping rod for clamping workpieces through the clamping foot against the supporting base and head.

10 Claims, 3 Drawing Sheets

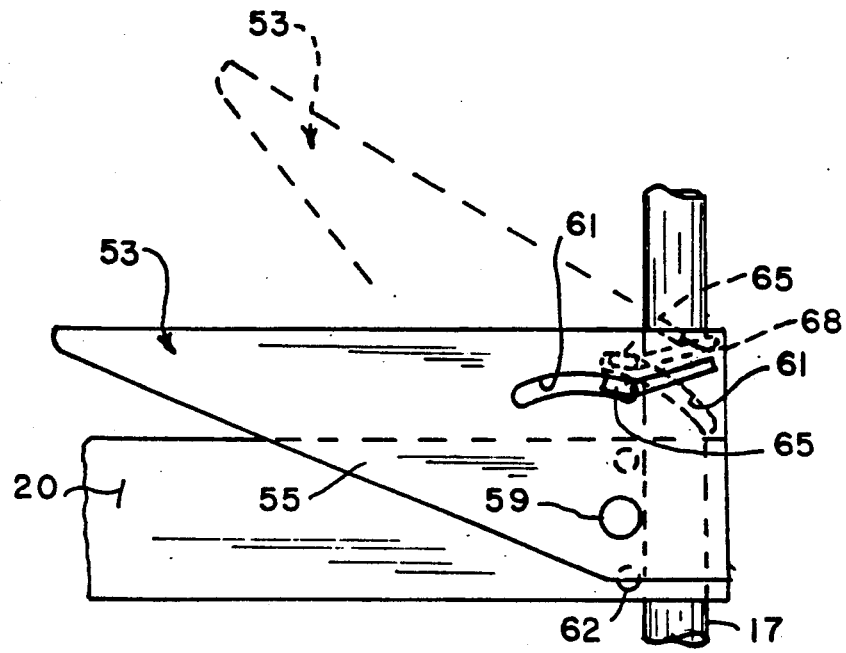
FIG. 6.
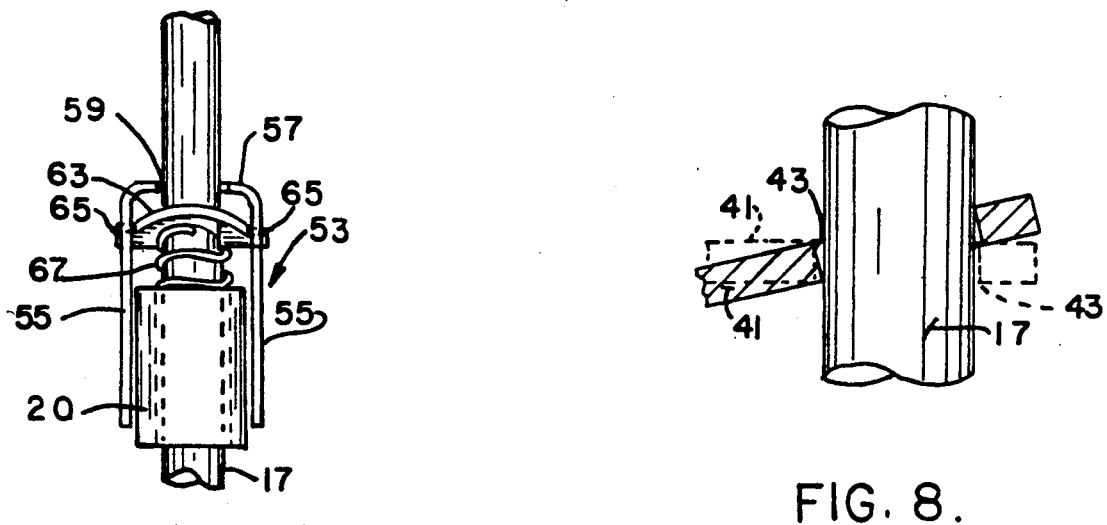
FIG. 7.
FIG. 8.

LEVER LOCK HOLD DOWN MECHANISM

CROSS REFERENCE TO RELATED APPLICATION

This is a continuation-in-part patent application of U.S. Ser. No. 507,459 filed Apr. 11, 1990 entitled LEVER LOCK HOLD DOWN MECHANISM, now abandoned.

BACKGROUND OF THE INVENTION

The present invention relates to a lever lock hold down mechanism for clamping workpieces to a miter gauge, as used in a table saw or band saw.

For cutting workpieces on table saws or band saws, the need for clamping workpieces in place during the cutting operation is apparent. Various types of workpiece clamping devices have been provided at the sides or edges, as well as in the slots of supporting work table surfaces of table saws and band saws. Such clamping devices may also include miter gauges for miter cutting or straight cross-cutting of workpieces, as desired. While several different clamping devices have been used in the prior art, they have not been as effective in the clamping of workpieces, as desired.

The present invention is directed to a lever lock mechanism for a miter gauge, used in such equipment, that provides substantially improved advantages and features not heretofore available in the prior art, including those summarized below.

SUMMARY OF THE INVENTION

The present invention relates to a new and improved lever lock hold down mechanism for miter gauges which overcomes the deficiencies of prior art constructions with substantially improved features and designs;

The provision of the aforementioned lever lock hold down mechanism which provides improved accuracy in clamping workpieces to work table supporting surfaces in table saws, band saws and the like;

The provision of the aforementioned lever lock hold down mechanism which is readily accessible by being conveniently employed in a most advantageous location in miter gauges;

The provision of the aforementioned lever lock hold down mechanism which is safe to operate without concern for improper use thereof or improper clamping of workpieces to work table supporting surfaces;

The provision of the aforementioned lever lock hold down mechanism which is simple, quick and easy to operate, can be readily manufactured with a minimum number of parts; requires low maintenance; may be used repeatedly without concern for malfunction; and is otherwise well adapted for the purposes intended.

Briefly stated, the present invention relates to a lever lock hold down mechanism for clamping workpieces to a miter gauge. The mechanism includes a base in the form of a bar which fits into a miter gauge slot in a workable surface for supporting workpieces and a head having a vertical surface extending upwardly from the base or bar. Clamping means extend further upwardly from the head and overlie the base or bar for clamping workpieces against the head and base or bar. The clamping means includes a vertically adjustable rod having a clamping foot at its lower end, a spring biased rod gripper mechanism that can be moved to an upper non-gripping position relative to said rod for vertical adjustment of the rod to accommodate workpieces of different thickness, and lever lock means which can be moved upward to move the rod gripper mechanism to the said non-gripping position and downward for applying a downward force to the spring biased rod gripper mechanism for overcoming the spring force thereof and for moving the rod gripper mechanism into continuous gripping engagement with the rod so as to apply a clamping force through the clamping foot to workpieces resting on the base or bar and positioned against the head.

The gripper mechanism includes an apertured gripper plate mounted over the rod, the aperture of the gripper plate being configured, arranged and dimensioned relative to the rod so as to fit loosely about the rod when the rod gripper mechanism is moved upwardly and for gripping the rod in impinging engagement therewith when moved downward by the lever lock means.

The lever lock means is pivotally mounted to the clamping frame through which the clamping rod extends, the clamping frame also supporting the spring biased rod gripper mechanism. The lever lock means is pivotally mounted to the clamping frame at a position laterally offset from the clamping rod so as to generate a moment of force to the apertured gripping plate for overcoming the spring biased force and for applying continuous gripping engagement to the gripper rod.

The apertured gripping plate includes an upstanding finger for engaging and maintaining the lever lock in an upward disengaged position through its spring biased force when the lever lock means is deactivated. The apertured gripping plate is slidably releasably engaged and disengaged by the lever lock means upon activation and deactivation thereof.

The clamping means further includes an associated handle for gripping by a user and the lever lock means includes a finger lever for activation by a user while also gripping the associated handle. The mechanism further includes a miter adjustment mechanism for changing the position of the base or bar and head, as may be desired, within a predetermined range of adjustment relative to the cutting apparatus used in conjunction therewith.

These and other objects and advantages of the present invention will become apparent from the description that is to follow.

BRIEF DESCRIPTION OF THE DRAWINGS

In the drawings.

FIG. 6 is a fragmentary side elevational view of a modified form of lever lock hold down mechanism coming within the scope of the present invention;

FIG. 7 is a fragmentary end elevational view of the modified form of lever lock hold down mechanism shown in FIG. 6; and FIG. 8 is an enlarged fragmentary side elevational view showing in full lines the gripping action of the lever lock mechanism on its associated clamping rod, while showing in phantom lines the non-gripping or de-activated position of the lever lock mechanism.

Corresponding reference numerals will be used through the several figures of the drawings.

DESCRIPTION OF THE PREFERRED EMBODIMENT

The following detailed description illustrates the invention by way of example and not by way of limitation. This description will clearly enable one skilled in the art to make and use the invention, and describes several embodiments, adaptions, variations, alternatives and uses of the invention, including what we presently believe is the best mode of carrying out the invention.

The present invention discloses two different lever lock hold down mechanisms as seen in FIGS. 1-5 and FIGS. 6-7 of the drawings. The general principles of operation of both constructions are broadly similar, differing only in certain specific features, as will become apparent from the discussion that is to follow.

Figure 1:
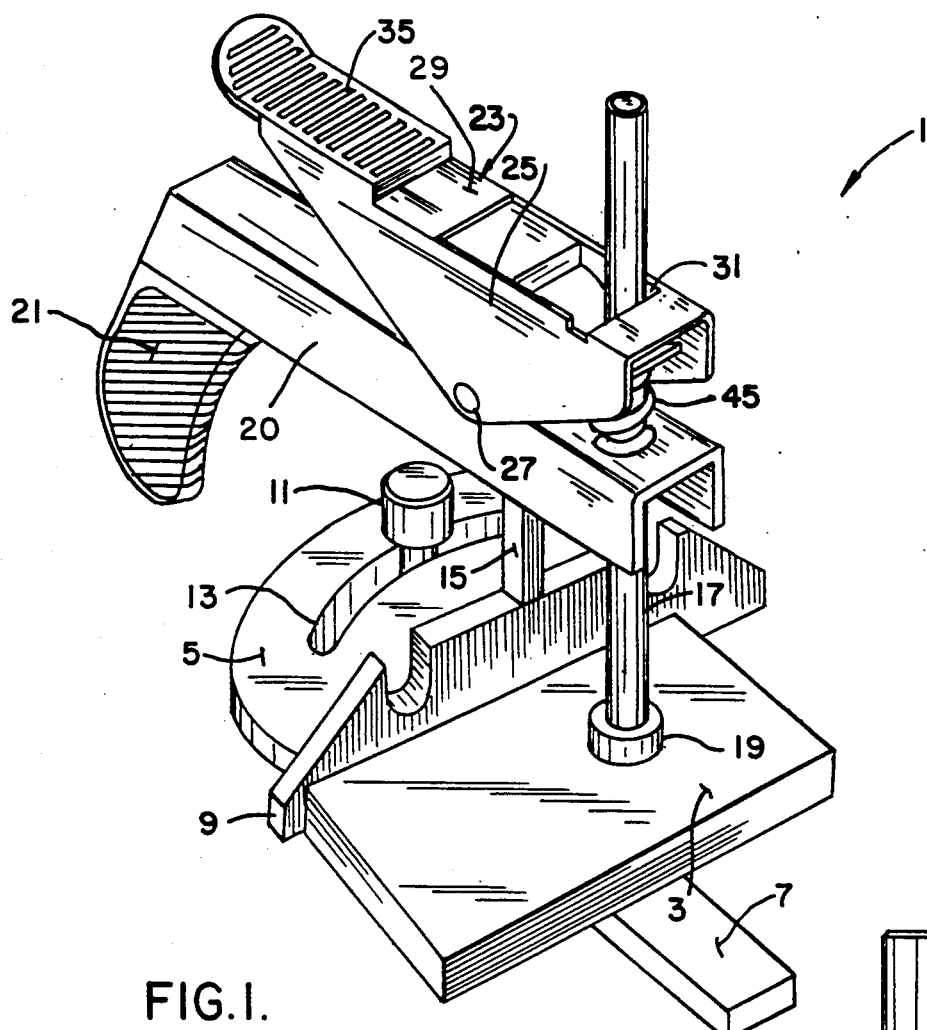
FIG. 1 is a perspective view of the lever lock hold down mechanism of the present invention shown as clamping a workpiece to a miter gauge, for use in table saws and band saws.

Referring first to the lever lock hold down mechanism 1 shown on FIGS. 1-5 of the drawings, it will be seen that mechanism 1 is constructed for clamping workpiece(s) 3 in place during a cutting operation by table saws or band saws, as will be apparent. As shown, the workpiece 3 is preferably clamped relative to a miter gauge assembly 5, including a base or bar 7 which fits into a miter gauge slot in a worktable surface (not shown). The miter guage assembly 5 also includes an interconnected head 9 having a generally vertically directed surface extending upwardly from the base or bar 7 for supporting the workpiece 3 on the base or bar 7 and worktable surface (not shown) and up against the vertical surface of the head 9, as shown in FIG. 1 of the drawings The miter gauge assembly 5 includes a pin 11, fixed to the bar 7 and a curvilinear slot 13, so as to enable the miter gauge assembly 5 and associated base or bar 7 as well as head 9 to be moved to various desired miter positions relative to cutting apparatus used in conjunction therewith.

In order to clamp the workpiece 3 to the supporting base or bar and head 7, 9, respectively, as shown in FIG. 1 of the drawings, the lever lock hold down mechanism 1 includes a vertical supporting rod 15 that extends vertically upwardly from the head 9, in order to allow the clamping components of the lever lock hold down mechanism 1 to overlie the supporting base or bar 7 for clamping the workpiece 3, as shown in FIG. 1.

Figure 2:
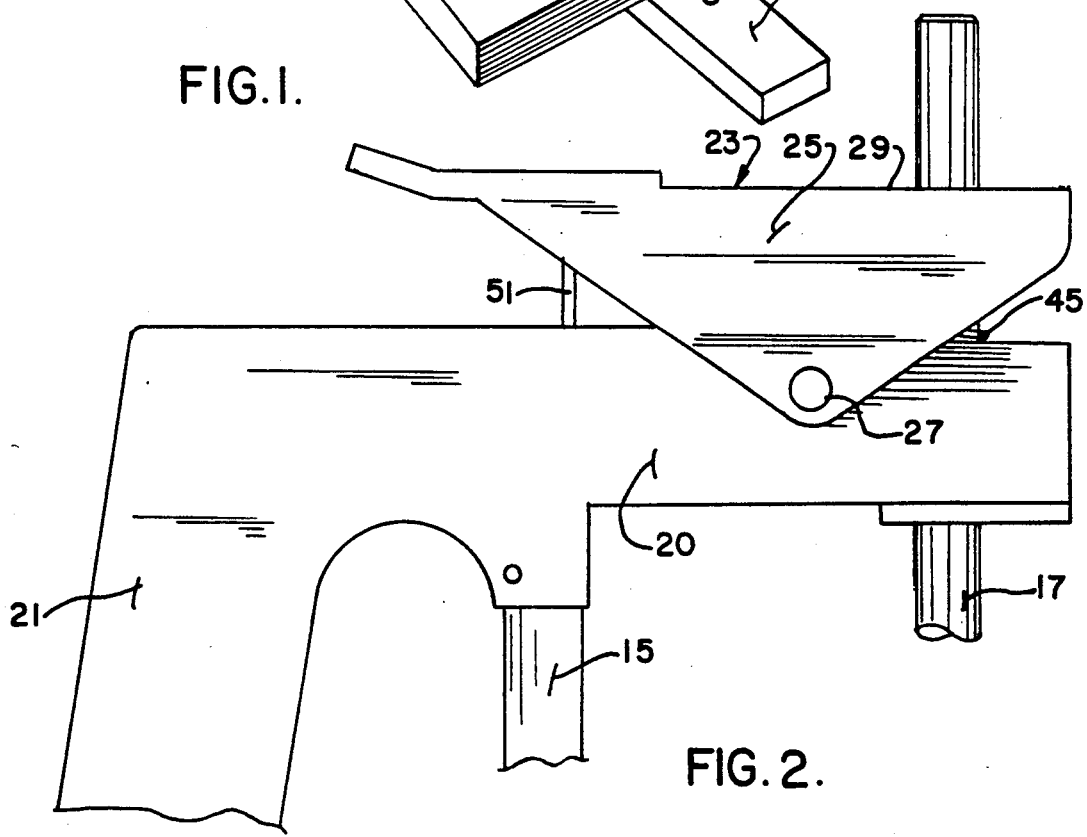
FIG. 2 is an enlarged fragmentary side elevational view of the lever lock hold down mechanism of the present invention.

The clamping components of the lever lock hold down mechanism 1 include a vertically adjustable clamping rod 17 having a clamping foot 19 at its lower end for engaging and clamping the workpiece 3 against the supporting base or bar 7. The vertically adjustable clamping rod 17 is adjustably supported relative to a U-shaped guide frame 20, which is attached to an upper end of the vertically extending supporting rod 15, as shown in FIG. 2 of the drawings, in order to fixedly mount the clamping frame 20 to the miter gauge 5 and associated base or bar and head 7, 9, respectively. The clamping frame 20, at an end remote from the vertically adjustable clamping rod 17, is provided with an associated handle 21 to enable a user to grip the handle 21 while operating the lever lock hold down mechanism 1, as will become apparent. The handle 21 may, if desired, be mounted to and supported by the pin 11, to provide structural support to the handle 21 while permitting miter guage adjustment through the pin 11 and curvilinear slot 13, as discussed above.

Figure 3:
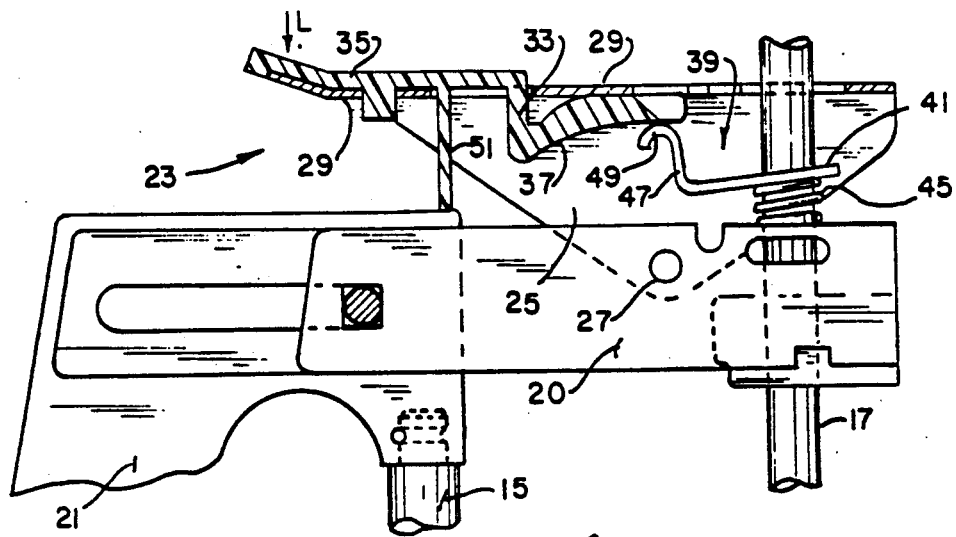
FIG. 3 is an enlarged fragmentary side elevational view, partly in section, of the lever lock hold down mechanism in its lower clamping position.

The clamping frame 20 may be horizontally adjusted relative to the handle 21, as shown by the pin and slot adjustment in FIG. 3 of the Drawings, to enable the clamping rod 17 and associated clamping foot 19 to be horizontally adjustably moved to the desired clamping position.

In order to permit vertical adjustment of the clamping rod 17 to accommodate workpieces 3 of different thickness, while also gripping the clamping rod 17 so as to apply a clamping force through the clamping foot 19 to workpieces resting on the supporting base or bar 7 and positioned against the head 9, the lever lock hold down mechanism 1 includes a pivoting lever lock 23.

The pivoting lever lock 23 includes a pair of spaced and parallel, triangular-shaped side sections 25, 25 which are positioned on opposite sides of the U-shaped clamping frame 20. A pin 27 pivotally mounts and secures the spaced and parallel side sections 25, 25 to the clamping frame 20 so as to enable the lever lock 23 to be pivotally mounted to the clamping frame 20. For purposes which will become apparent below, the lever lock 23 is pivotally mounted to the clamping frame 20 at a position laterally offset from the clamping rod 17.

Extending between the spaced and parallel side sections 25, 25 is an upper intermediate bight or interconnecting portion 29 having an elongated hole 31 for receiving the clamping rod 17. The elongated hole 31 in the interconnecting portion 29 enables the lever lock 23 to be pivotally mounted about the pivot 27 without interfering or contacting the clamping rod 17.

The lever lock 23 further includes a cam lever 33 which is assembled relative to the interconnecting portion 29 and/or spaced and parallel side sections 25, 25 of the lever lock 23 by complementary mating engagement therewith or by being fastened or otherwise secured thereto. The cam lever 33 includes a finger lever portion 35 which overlies the interconnecting portion 29 so as to provide a freely engageable finger lever for engagement by a user while also gripping the associated handle 21, as will be understood. At an opposite end from the finger lever portion 35, the cam lever 33 includes a cam section 37, which is used along with a gripper mechanism, to apply a continuous gripping force to the clamping rod 17 so as to clamp it, as desired.

Figure 4:
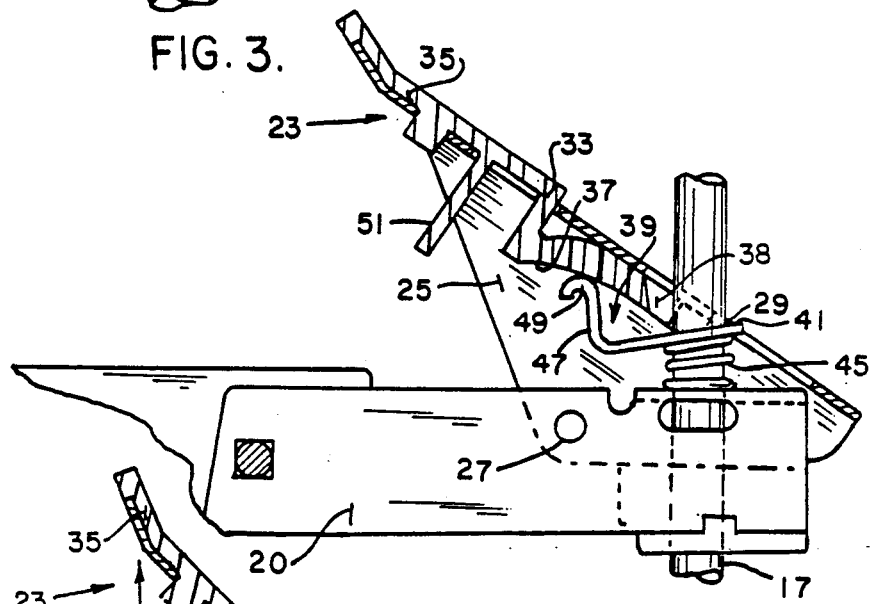
FIG. 4 is an enlarged fragmentary side elevational view of the lever lock hold down mechanism in its mid or free position.

Specifically, the cam section 37 is configured, arranged and dimensioned to provide an "overcenter" cam shape for engaging and holding the spring biased rod gripper mechanism 39 in a lower or clamped position, as represented by the arrow L shown in FIG. 3 of the drawings. This causes the spring biased rod gripper mechanism 39 to grip the vertically adjustable rod 17 and apply a clamping force through the clamping foot 19 to a workpiece 3 resting on the supporting base or bar 7 and worktable surface (not shown), as will be discussed further below. The spring biased rod gripper mechanism 39 includes an apertured gripper plate 41 which is positioned about the rod 17 above the clamping frame 20, as best seen in FIG. 3-4 of the drawings. A coil spring 45 is positioned about the clamping rod 17 and is trapped between the apertured gripper plate 41 and the clamping frame 20. The aperture 43 of the gripper plate 41 (shown in FIG. 8) is constructed to fit snuggly about the clamping rod 17 when the spring biased rod gripper mechanism 39 is in the lower or clamped position, as shown in FIG. 4 of the drawings.

The mid or free position is shown in FIG. 4 of the drawings where the apertured gripper plate 41 is normally biased upwardly but retains an angular or inclined position relative to the clamping rod 17. The clamping rod 17 can be slipped downwardly through the aperture 43 in the apertured gripper plate 41 because downward motion overcomes the spring force. Upward movement of the clamping rod 17 relative to the apertured gripper plate 17 is limited because the angularly offset apertured gripper plate 17 grips the clamping rod 17 in impinging engagement, as shown in FIG. 8 of the drawings.

Figure 5:
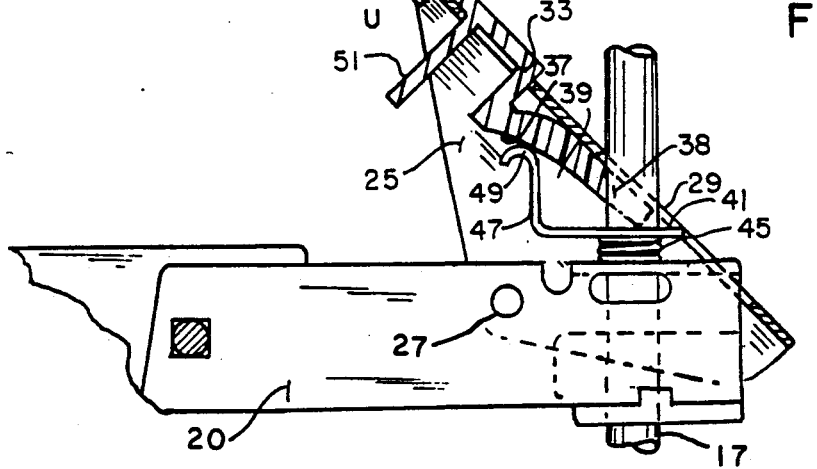
FIG. 5 is an enlarged fragmentary side elevational view of the lever lock hold down mechanism in its upper or release position.

In order to be moved to an upper or release position, the pivoting lever lock 23 including the interconnecting bight portion 29 and cam lever 33 are capable of being raised further by the finger lever portion 35, as shown in FIG. 5. Lifting the finger lever portion 35, as represented by the arrow U, causes the lever lock 23 to rotate in a clockwise direction to release the rod 17.

Note in FIG. 5 of the drawings that the apertured gripper plate 41 assumes a generally horizontal position and thus fits loosely about the clamping rod 17. This is further shown in the phantom line position of the plate 41 in FIG. 8 of the drawings, where vertical adjustment of the clamping rod 17 to accommodate work pieces of different thickness is then possible.

When the finger lever portion 35 is raised to the upper or release position, spaced finger elements 38 at an opposite end of the cam lever 33 engage and bear down upon the apertured gripper plate 41 at a point on the opposite side of the centerline of rod 17 and spring 45 from the end portion 49, as shown in FIG. 5, in order to move the apertured gripper plate 41 to a generally horizontal position, as shown in phantom lines in FIG. 8, where the apertured gripper plate 41 does not grip or engage the clamping rod 17. Preferably, the spaced finger elements 38 bear upon the apertured gripper plate 41 on opposite sides of the clamping rod 17.

It will be noted that the apertured gripper plate 41 includes an upstanding finger 47 and transversely curving free end portion 49 that engages the cam portion 37 of the cam lever 33. The upstanding finger 47, through the coil spring 45, maintains the lever lock, including the cam lever 33 in the mid or free position shown in FIG. 4 of the drawings, until the lever lock 23 is moved to the lower or clamped position shown in FIG. 3 of the drawings or the upper or released position shown in FIG. 5.

After the desired vertical adjustment of the clamping rod 17 is made, the lever lock 23 is moved from the mid or free position shown in FIG. 4 to the lower or clamped position shown in FIG. 3 by simply depressing the finger lever 35 so as to pivot the lever lock 23 about the off center pivot point 27. This causes the reversely curved free end portion 49 of the upstanding finger 47 to be engaged by the cam portion 37, which itself is configured, arranged and dimensioned with an "overcenter" shape such that it will apply a camming force to the reversely curving free end portion 49 of the upstanding finger 47 and move the apertured gripper plate 41 from the mid or free position shown in FIG. 4 to the lower or clamped position shown in FIG. 3. This camming action forces the apertured gripper plate 41 and rod 17 downward, and with the "overcenter" shape, causes the cam lever 33 to stay in the lower or clamped position, thus clamping the workpiece. The cam lever 33 can be moved to the mid or free position shown in FIG. 4 when the finger lever portion 35 is raised; however, the cam lever 33 will not move from its lower or clamped position until raised. The reaction force from the clamping action adds to the spring force and tightens the gripping action between the apertured gripper plate 41 and rod 17 so that the clamping rod 17 doesn't slip when clamped against the workpiece.

When the apertured gripper plate 41 is moved to the angular offset position shown in FIG. 3 of the drawings, the aperture 43 in the apertured gripper plate is foreshortened or contracted in diameter, so as to increase the gripping engagement with the clamping rod 17 and provide the desired clamping force through the clamping rod 17 to the clamping foot 19 for clamping workpieces. This action is best illustrated in FIG. 8 in the full line representation showing the apertured gripper plate 41 engaging the clamping rod 17. The apertured gripper plate 41 engages the clamping rod 17 as long as the lever lock 23 is in the lower or clamped position shown in FIG. 3, although in the mid or free position, the apertured gripper plate 41, through the spring force, engages and prevents upward movement while allowing downward sliding movement of the clamping rod 17. In the upper or released position, the apertured gripper plate 41 assumes a horizontal position to permit adjustable upward or downward movement of the clamping rod 17, as desired.

A depending foot 51 may be provided on the cam lever 33 for engaging an upper surface of the clamping frame 20, so as to maintain the lever lock 23 in the position shown in FIG. 3 of the drawings. It will be apparent that a sufficient moment of force will be generated by the off center pivot mounting and lever lock 23, when moved to the position shown in FIG. 3 of the drawings, so as to lock the apertured gripper plate 41 in continuous gripping engagement relative to the clamping rod 17. The foot 51, therefore, prevents unnecessary over-center movement of the lever lock 23.

Reference is now made to the lever lock hold down mechanism construction shown in FIGS. 6–7 of the drawings. All of the components including the clamping rod 17 and the clamping frame 20 are constructed similar to the FIGS. 1–4 embodiment; however, the lever lock mechanism 53 and associated elements are differently constructed. Specifically, the lever lock 53 comprises a U-shaped element (see FIG. 6) with partial triangularly-shaped side sections 55, 55 and an interconnecting upper portion 57 having and an aperture 59 therein through which the clamping rod 17 extends. The lever lock 53 is pivotally mounted in a laterally offset position relative to the clamping rod 17 at 59, enabling the lever lock 53 to be moved from the full line lower or clamped position to the dotted line mid or free position shown in FIG. 6 of the drawings. Side pins 62 may be provided in the clamping frame 20 for guiding the rod 17 relative to the clamping frame 20, as will be appreciated. Each of the spaced and parallel side sections 55, 55 of the lever lock mechanism 53 includes a curvilinear cam slot 61 which is shown in FIG. 6 of the drawing in both full and phantom lines, to represent lower or clamped and mid or free positions of the lever lock mechanism 53. An apertured gripper plate 63 is mounted on the clamping rod (see FIG. 6) and has a pair of opposed ears 65, 65 which extend through the curvilinear slots 61, 61 in the spaced and parallel side sections 55, 55. A coil spring 67 is trapped between the apertured gripper plate 63 and the clamping frame 20 so as to maintain the apertured gripper plate 63 in a normal upwardly biased position.

When it is desired to move the lever lock mechanism 53 from the dotted mid or free position to the full lined lower or clamped position shown in FIG. 6 of the drawings, the lever lock 53 is depressed at its outer free end causing apertured gripper plate 63 and the clamping rod 17 to be forced downward and to the right side of the cam slots 61, 61, so as to apply continuous gripping force on the clamping rod 17. The clamping engagement of the apertured gripper plate 63 relative to the clamping rod 17 will be similar to the FIG. 8 illustration as discussed above in connection with the FIGS. 1-5 embodiment. The ends of the cam slots 61, 61 are provided with a small dwell section to permit lock 53 to remain in clamped position.

When the lever lock mechanism 53 is moved from the full line lower or clamped to the dotted line mid or free position shown in FIG. 6 of the drawings, the gripping force, through the apertured gripper plate 63, prevents upward movement of the clamping rod 17 while allowing it to slide downwardly because downward motion overcomes the spring force.

As shown in FIG. 6 of the drawings, the ears 65, 65 of the apertured gripper plate 63 will be moved to the left side of the cam slots 61, 61 when the lever lock mechanism is moved to an upper or release position (not illustrated). As in the FIG. 1-5 embodiment, spaced finger elements 68 extending from the lever lock 53 are preferably positioned on opposite sides of the clamping rod 17, in order to engage and depress the apertured gripper plate 63 to move it to a horizontal position where it is out of gripping engagement with the clamping rod, as discussed above. This occurs when the outer free end of the lever lock mechanism 53 is lifted upwardly, in the same manner as discussed in connection with the FIGS. 1-5 embodiment.

From the foregoing, it will now be appreciated that the lever lock mechanism of the present invention, such as disclosed in the FIGS. 1-5 or 6-7 embodiments, or variations or modifications thereof, allows convenient clamping of a workpiece to a miter gauge during a cutting operation in a table saw or band saw. For example, the hold down rod may be offset 5° or 10° from vertical so that the clamping foot is moved closer to the vertical head surface and force the workpiece against the vertical head surface. In addition to accessibility as a result of the convenient location, the lever lock hold down mechanism of the present invention provides improved accuracy and speed in clamping. Adjustment of the clamping rod to accommodate different sizes of workpieces, as well as quick engagement and release of the lever lock hold down mechanism, results in a new and improved construction providing the aforementioned features which have heretofore not been available in the prior art.

In view of the above, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

We claim:

1. A lever lock hold down mechanism for clamping workpieces to a miter gauge including a base for supporting workpieces, a generally vertically directed head extending upwardly from said base, and clamping means extending upwardly from said head and overlying said base for clamping workpieces against the base and head, said clamping means including a vertically adjustable rod having a clamping foot at its lower end, a spring biased rod gripper mechanism which is capable of being moved from a free mid position to a lower clamping position or to an upper released position relative to said rod, said spring biased rod gripper mechanism engaging and gripping said rod in its lower clamping position while being disengaged from said rod in its upper released position for vertical adjustment of said rod to accommodate workpieces of different thickness, lever lock means for applying a downward force to the spring biased rod gripper mechanism for overcoming the spring force thereof and for moving the rod gripper mechanism to its lower clamped position for continuous gripping engagement with said rod so as to apply a clamping force through said clamping foot to workpieces resting on said base and positioned against said head, and said lever lock means being moved upwardly to a free mid position for partially disengaging the spring biased rod gripper mechanism relative to said rod so as to permit downward movement while limiting upward movement of said rod, and means for completely disengaging the spring biased rod gripper mechanism from said rod when said lever lock means is moved to an upper released position.

2. The lever lock hold down mechanism as defined in claim 1 wherein said rod gripper mechanism includes an apertured gripper plate mounted over said rod, the aperture of said gripper plate being configured, arranged and dimensioned relative to the rod so as to be moved out of engagement when said rod gripper mechanism is moved to its upper release position and for gripping said rod in impinging engagement therewith upon downward actuation of said lever lock means to move said rod gripper mechanism to its lower clamping position.

3. The lever lock hold down mechanism as defined in claim 2 wherein the lever lock means is pivotally mounted to a clamping frame through which said clamping rod extends, said clamping frame also supporting said spring biased rod gripper mechanism.

4. The lever lock mechanism as defined in claim 3 wherein said lever lock means includes overcenter cam means to generate a downward moment of force to said apertured gripper plate for cooperating with the spring biased force in applying continuous gripping engagement to said clamping rod.

5. The lever lock mechanism as defined in claim 4 wherein said apertured gripper plate includes an upstanding finger for engaging and maintaining said lever lock means in its free mid position through its spring biased force when said lever lock means is de-activated from its lower clamping position.

6. The lever lock mechanism as defined in claim 5 wherein said lever lock means includes finger elements for moving said apertured gripper plate to a non-engaged horizontal position relative to said clamping rod when said lever lock means moves to an upper released position.

7. The lever lock mechanism as defined in claim 6 wherein the apertured gripper plate is movable from a free mid position to a lower clamped position or to an upper released position by pivotal movement of said lever lock means on said clamping frame.

8. A lever lock hold down mechanism for clamping workpieces to a miter gauge including a base for supporting workpieces, a generally vertically directed head extending upwardly from said base, and clamping means extending upwardly from said head and overlying said base for clamping workpieces against the base and head, said clamping means including a vertically adjustable rod having a clamping foot at its lower end, a spring biased rod gripper mechanism which is capable of being moved to an upper non-gripping position relative to said rod for vertical adjustment of said rod to accommodate workpieces of different thickness, said spring rod gripper mechanism including an apertured gripper plate mounted over said rod, the aperture of said gripper plate being configured, arranged and dimensioned relative to the rod so as to be moved out of engagement when said spring biased rod gripper mechanism is moved to an upper non-gripping position and for continuously gripping said rod in impinging engagement therewith when moved to a lower gripping position, the apertured gripper plate being substantially horizontal in an upper non-gripping position relative to said rod while being angularly offset in continuous gripping and impinging engagement with said rod in its lower gripping position, said rod being vertically adjustable to a predetermined location relative to said apertured gripper plate to accommodate workpieces of different thickness when said apertured gripper plate is in its upper non-gripping position, and lever lock means for applying a downward force to the spring biased rod gripper mechanism including said apertured gripper plate for overcoming the spring bias thereof and for moving said apertured gripper plate into continuous gripping and impinging engagement with said rod so as to apply a clamping force through said clamping foot to workpieces resting on said base and positioned against said head, said lever lock means being pivotally mounted to said clamping frame at a position laterally offset from said clamping rod so as to generate a moment of force relative to said apertured gripper plate for gripping said rod, cam means associated with said lever lock means for overcoming said spring biased rod gripper mechanism including said apertured gripper plate so as to initiate the application of continuous gripping and impinging engagement of said apertured gripper plate relative to said rod, and said lever lock means including means for moving the apertured gripping plate to a substantially horizontal position for non-gripping engagement with said rod when said lever lock means is moved to said upper non-gripping position.

9. The lever lock mechanism as defined in claim 8 wherein the lever lock means includes finger elements for moving said apertured gripper plate to a non-engaged horizontal position relative to aid clamping rod when said lever lock means moves to an upper released position.

10. The lever lock mechanism as defined in claim 5 wherein said lever lock cam means operatively engages the upstanding finger of said apertured gripper plate for initiating the application of continuous gripping and impinging engagement of said apertured gripper plate relative to said rod.

* * * * *